Figure 1:
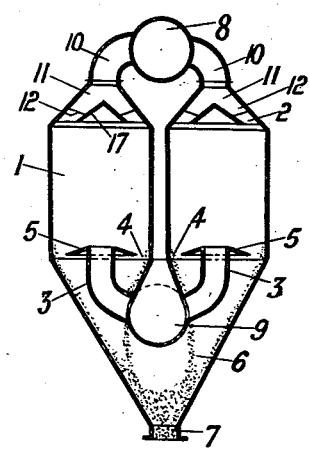

April 25, 1933.  W. ALEXANDER  1,905,779
CENTRIFUGAL SEPARATOR
Filed Jan. 30, 1932  2 Sheets-Sheet 1

Inventor
William Alexander
By Pennie, Davis, Marvin & Edmonds
Attorneys

April 25, 1933.  W. ALEXANDER  1,905,779
CENTRIFUGAL SEPARATOR
Filed Jan. 30, 1932   2 Sheets-Sheet 2

Inventor
William Alexander
By Pennie, Davis, Marvin & Edmonds
Attorneys

Patented Apr. 25, 1933

1,905,779

UNITED STATES PATENT OFFICE

WILLIAM ALEXANDER, OF GLASGOW, SCOTLAND

CENTRIFUGAL SEPARATOR

Application filed January 30, 1932, Serial No. 589,830, and in Great Britain January 1, 1932.

The invention relates to separators in which gas, vapour or steam has a rotary motion in a vortex chamber or separating chamber wherein by the action of centrifugal force suspended impurities, whether liquid or solid, are thrown out to the sides of the chamber.

In the following description the term "separator" is intended to include vortical or centrifugal apparatus of the class indicated; the term "gas" is intended to include any gas, vapour or steam; and the term "dust" is intended to include any impurities to be removed from the "gas".

The invention provides a separator comprising a plurality of cylindrical centrifugal separator components acting in parallel and mounted on a common dust hopper or dust collecting chamber having one or more dust outlets. These separator components are of the vertical or nearly vertical type having a gas inlet passage or passages situated at or near one end of the vortex chamber and supplying directly (i. e., without any by-pass) to the chamber all of the entering gas with a tangential component of motion, and having a gas outlet pipe situated at or near the other end of said chamber and coaxial therewith. The gas outlet pipe does not pass through the core of the vortex but is so disposed as to lead all of the gas directly (i. e., without any by-pass) from the discharge end of the vortex in a direction away from the inlet end of the chamber but with a tangential component of motion, ensuring that the vortex shall be entire and unobstructed to its core. The separator components are not enclosed in any enveloping casing, but are each exposed to the external atmosphere. Each vortex chamber has a dust outlet (or outlets) which allows all of the separated dust to pass from the chamber near or at the circumference and at a radius substantially greater than that of the gas outlet pipe.

Such a multiple separator enables the following advantages to be realized: When designed for a given duty, as regards volume, density and pressure drop of gas treated, the multiple separator has a higher extraction efficiency than a single unit type separator designed for the same duty and having a vortex of substantially the same geometrical proportions as the smaller vortices of the multiple separator. The multiple separator can thus have shorter vortical length and can occupy less axial space than the single unit type separator. Again, as compared with a set of small self-contained single unit type separators, working in parallel and of the same total duty or capacity, the single hopper of the multiple separator, being deeper than the dust hoppers of the comparatively small self-contained separators of a set, there is greater average quiescence of the gas in the deeper hopper, in which, therefore, there is easier settlement of the dust entering from the vortex chambers. Also, the single large hopper of the multiple separator can be arranged with one dust outlet from which the dust is more easily removed than from the several dust outlets of a set of single unit type separators. Further, in the multiple separator the separator components can be arranged more compactly and without an enveloping casing, so that a minimum of space is occupied, and, because only a single hopper and only one supporting structure are required, the total construction is simpler and cheaper than for a set of small single unit type separators.

Each separator component, of which there are two or more in all of the forms of multiple separator hereafter referred to, includes: (a) a vertical or nearly vertical cylindrical vortex chamber or separating chamber free of internal obstruction from inlet to outlet and not enveloped in a casing; (b) either an inclined gas inlet passage or passages, leading through the side of the vortex chamber or an extension thereof, or an annular gas inlet passage situated at or near one end of the vortex chamber, and provided or not with inclined vanes, the said passage or passages being arranged to lead all of the gas into the vortex chamber with tangential component of motion at or near the circumference of the vortex; (c) a gas outlet pipe having its inner end substantially coaxial with the vortex chamber and situated at or near the end remote from the inlet end of the vortex chamber and so arranged as to convey directly all of the gas from the chamber in a direction away from the inlet end; and (d) dust passages or perforations situated at the lower end at the periphery of the vortex chamber or at the side of the vortex chamber for allowing dust therefrom to fall into the hopper.

Figure 2:
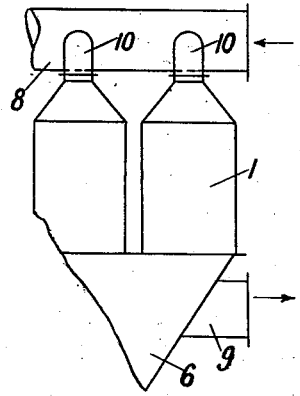
Figure 3:
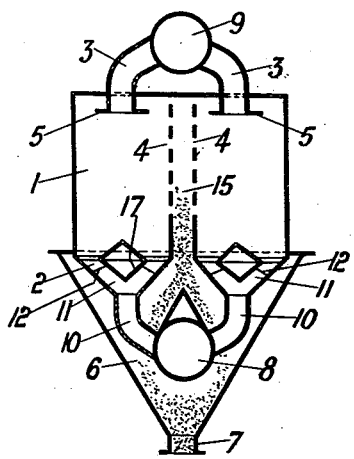

Several forms of multiple separators according to the invention are illustrated by way of example in the accompanying drawings:—Fig. 1 is a vertical section and Fig. 2 an elevation at right angles thereto of a vaned down-flow separator. Fig. 3 is a vertical section and Fig. 4 a half horizontal section half plan view of a vaned up-flow separator. Fig. 5 is a vertical section and Fig. 6 a part plan of a vaneless down-flow separator. Fig. 7 is a vertical section of a vaneless up-flow separator.

In all of the figures, 1 denotes the vortex chamber or separating chamber to which all of the gas, having a circumferential component of velocity, is admitted from the inlet passage or passages 2, which may be of parallel, converging or diverging cross section. The axis of the vortex chamber is shown as being vertical. All of the gas, while yet in vortical motion, is discharged directly from the vortex chamber by way of the outlet pipe 3 the inner end of which is coaxial or nearly coaxial with the vortex chamber and is situated at or near the opposite end from the inlet. It will be observed that this pipe 3 does not lead through the vortex in the vortex chamber and that it conveys the discharged gases in a direction away from the inlet end of the chamber wherein the gas motion is of "free" vortex character. The openings 4 allow all of the separated dust to be ejected from the vortex chamber at or near the periphery of the vortex and at a radius substantially greater than that of the gas outlet pipe.

An imperforate flange 5 may be fixed at or near the inner end of pipe 3 which is also imperforate.

The dust that passes through the openings 4 settles in the common dust hopper 6 situated below the separator components. There may be one or more dust outlets 7 for the removal of dust from the hopper. The main or common gas supply passage or passages is shown at 8; 9 is the main or common gas discharge passage. The common supply and discharge passages are situated beyond the opposite ends of the separating components.

In the forms shown in Figs. 1, 2, 3, 4, 5 and 6, the main supply passage or passages 8 has branch passages 10 each of which permits the gas to enter an admission chamber 11 which is situated at one end of, is coaxial with, and has fluid communication with, the vortex chamber.

Figure 4:
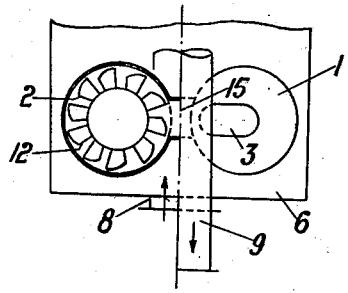
Figure 5:
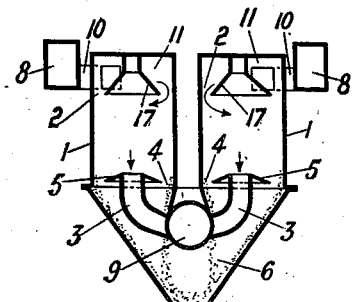
Figure 6:
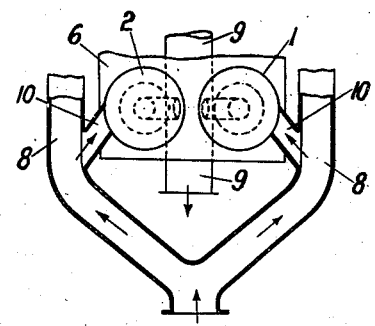
Figure 7:
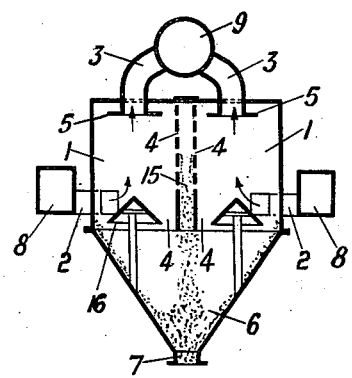

In Figs. 1, 2, 3 and 4 the inlet passages 2, through which all of the gas flows with a circumferential component from the admission chamber to the vortex chamber, are of annular shape, the annulus being divided by inclined vanes 12; in Figs. 5 and 6 the inlet passage 2 is vaneless, but the flow therein has also a circumferential component due to the branch passages 10 being inclined. From the gas outlet pipes 3 all of the gas passes direct into the main 9.

In the form shown in Fig. 7 there is no admission chamber, but all of the gas passes with tangential component of motion direct from the inclined inlet passage or passages 2 into the vortex chamber, the passages 2 being connected directly to the supply main. In this case also all of the gas is discharged directly by outlet pipes 3 to the main 9 of which the pipes 3 are branches. The vortex chamber 1 may be partially partitioned from the dust hopper by the diaphragm 16.

When the dust passages 4 are formed in the side of the vortex chamber, as shown in Figs. 3, 4 and 7, the dust is ejected into a side channel 15 which leads down to a common hopper, whereas, when the dust passages 4 are at the lower end of the vortex chamber (as in Figs. 1 and 5) the dust falls directly from these passages into the common hopper. In all of the figures except Fig. 7 the admission chamber is partially isolated from the vortex chamber by a partition 17 which causes the admitted gas to enter the vortex chamber near its periphery and at a substantial radial distance from the side of the gas outlet pipe 3.

The action of the described appliances will be easily understood. In all of the multiple separators described all of the gas enters a vortex chamber directly i. e., without by-passing) and has a circumferential component of velocity. This may be caused by the inclined vanes alone as in the separators illustrated in Figs. 1 and 3, or may be caused by the inclined inlet passages 2 alone as in the separator shown in Fig. 7. In the separator shown in Fig. 5, the circumferential component of velocity may be caused by inclining the branch pipes 10 when this separator has no vanes; or it may be caused by inclined vanes when these are provided in the annular inlet passage 2 of the separating chamber, in which case the branch pipes 10 may be either inclined, as shown in plan in Fig. 6, or not inclined, as desired. The gas at entry thus having a whirling motion, and as it flows to a central outlet at or near the opposite end of the obstructionless separating chamber, a true "free" vortex is formed in the chamber. The suspended dust is forced by centrifugal action to the outside of the vortex, and thence through the dust passages 4, and gravitates to the outlet 7 of the common hopper, in which there is little or no gas motion. The advantage of admitting the gas to the vortex at or near its periphery is that the suspended dust has only a small radial distance to cross to reach the inner wall of the chamber along which the dust moves to the dust passages.

When it is desirable that one multiple separator should deal at the same time with one supply $S_1$ of gas containing a coarse dust and another supply $S_2$ of gas containing a fine dust, there may be mounted on one hopper a separating component (or components) to deal with $S_1$, having different proportions from the component or components for dealing with $S_2$. A corresponding modification may be provided for three or more simultaneous gas supplies.

I claim:—

1. A multiple separator comprising a plurality of centrifugal separator components acting in parallel, each of said components incorporating a substantially vertical exposed cylindrical vortex chamber having a gas inlet at one end and a gas outlet at the opposite end, said chamber being entirely free from internal obstructions from the gas inlet to the gas outlet, said inlet admitting directly all of the gas into the vortex chamber near the periphery of the vortex with a tangential component of motion, the gas outlet being constituted by an outlet pipe having its inner end coaxial with the chamber and arranged to convey all the gas from said chamber in a direction away from the inlet end of the chamber, a dust outlet from the chamber, and a partition extending from said outlet pipe towards the wall of the chamber, compelling all of the separated dust to pass from the chamber at or near its periphery and at a radius substantially greater than that of said outlet pipe, and an unenclosed dust hopper common to said components and open to the several dust outlets, said components being mounted outside of and on top of said hopper.

2. A multiple centrifugal separator as claimed in claim 1 in which the gas inlet and outlet of the vortex chambers are connected with common gas supply and common gas discharge pipes at the opposite ends of the chambers beyond said ends.

3. A multiple centrifugal separator as claimed in claim 1 in which the gas inlet to each vortex chamber is vaned.

4. A multiple separator according to claim 1 in which each component has its own gas admission chamber disposed at one end of and partitioned from the vortex chamber so as to leave an annular passage between the admission chamber and the vortex chamber, said admission chamber being supplied with gas by a pipe of smaller diameter than the admission chamber.

5. A multiple centrifugal separator as claimed in claim 1 in which a flange is provided on the inner end of the gas outlet pipe of each component.

In testimony whereof I have signed my name to this specification.

WM. ALEXANDER.